Patented May 19, 1931

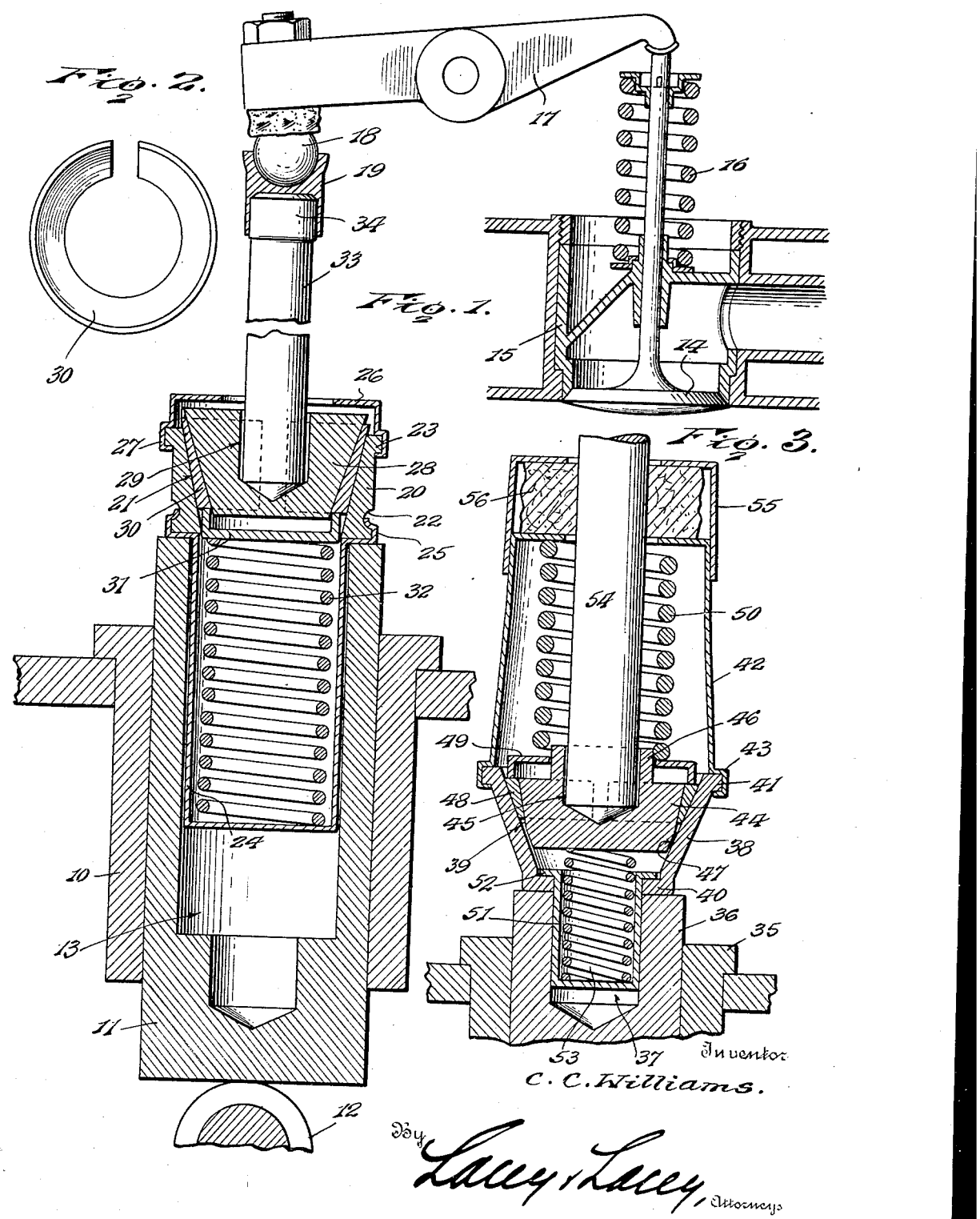

1,806,231

UNITED STATES PATENT OFFICE

CALVIN C. WILLIAMS, OF PHILADELPHIA, PENNSYLVANIA

VALVE ACTUATING MECHANISM

Application filed September 6, 1928. Serial No. 304,371.

This invention relates to an improved valve actuating mechanism of the general character disclosed in my co-pending applications filed of even date herewith, Ser. Nos. 340,369 and 340,370.

The invention seeks, among other objects, to provide a mechanism including a push rod embodying a novel slip joint automatically operable to accommodate lengthening or shortening of the rod and wherein the slip joint will include a floating clutch member of simplified construction but will, nevertheless, offer a relatively large bearing area to the male and female clutch members of the joint so as to obviate premature wear of these parts.

Other objects of the invention not specifically mentioned in the foregoing will appear during the course of the following description.

In the drawings,

Figure 1 is a vertical sectional view showing my improved mechanism in connection with a conventional overhead valve, Figure 2 is a detail plan view of the floating clutch member employed, and Figure 3 is a fragmentary vertical sectional view showing a slightly different embodiment of the invention.

Referring now more particularly to the drawings, I have shown a fixed tappet guide at 10, and slidable through said guide is a tappet 11 operable by a cam shaft 12, the tappet being provided with the customary axial recess 13. A conventional overhead valve of an internal combustion engine is indicated at 14, and slidably supporting the valve is a cage 15, the valve being normally held closed by a spring 16. Mounted to coact with the upper end of the valve stem is a rocker 17 carrying an adjustable ball 18, and formed to coact with said ball is a socket 19.

In carrying the invention into effect, I employ a push rod in which is incorporated a novel slip joint. This joint includes a female clutch member in the form of a clutch cup 20 open at its ends and having a conical inner face 21. Surrounding the cup near its lower extremity is an external groove 22, while near its upper end the cup is provided with an annular overhanging flange 23. Attached to the cup at its lower end is a depending socket 24 offset near its upper end and provided with a flange 25 which is rolled into the groove 22 for rigidly connecting the socket with the cup. The socket more or less freely fits within the recess 13 of the tappet 11 for centering the clutch cup with respect to the tappet while the offset near the upper end of the socket rests flat against the upper end face of the tappet. Fixed to the cup 20 at its upper end is an upstanding cap or housing 26 provided at its lower end with a channel member 27 snugly embracing the flange 23 for rigidly connecting the cap with the cup.

Housed by the cap 26 is a conical male clutch member 28 which extends into the female clutch cup 20 axially thereof and formed in the member 28 is an axial socket or recess 29. Formed to coact with the clutch members 20 and 28 is an inverted floating clutch member 30. As shown in Figure 2, this clutch member is in the form of a split frusto-conical ring, while as brought out in Figure 1, the wall of said member is gradually thickened from the larger end of the member towards the smaller end thereof. This floating clutch member is formed of resilient material so that said member may be flexed and thus expand and contract in diameter and as will be observed, the outer face of said member is inclined to seat flat against the conical inner face 21 of the cup 20, while the inner face of said member is inclined to seat flat against the conical outer face of the male clutch member 28. Resting against the edge of the floating clutch member 30 at its smaller end is a follower 31 of a diameter to pass freely through the smaller end of the cup 20, and acting against said follower is a spring 32 which is freely accommodated within the socket 24. The spring is of course of far less strength than the valve spring 16.

Extending freely through the top wall of the cap 26 of the female clutch member is a push rod element 33 which freely fits within the socket 29 of the male clutch member 28, and formed on the upper end of said element is a head 34 over which the socket 19 snugly fits.

As will be observed, the male clutch member and associated parts are enclosed by the female clutch member 20 and cap 26 to provide a permanently assembled slip joint which is separate and distinct from the other parts of the mechanism. Accordingly, when installing the mechanism, the slip joint may be first connected with the tappet 11, when the push rod element 33 may be inserted at its lower end into the male clutch member 28 and the socket 19 disposed over the head 34 to coact with the ball 18.

Assuming now that the tappet 11 is being raised, the upward thrust or jar of the tappet will, as will be observed, be transmitted directly to the floating clutch member 30 and of course, at the instant such upward thrust is transmitted to said member, the valve 14, spring 16, rocker 17 and push rod element 33 will be at rest. Accordingly, the inertia of these parts will be sufficient to maintain the push rod element stationary momentarily and oppose the upward thrust or jar of the tappet with sufficient force to cause upward movement of the clutch cup 20 with coincident downward endwise slipping of the clutch member 30 independently of the clutch member 28. As the floating clutch member thus moves downwardly in the cup 20 said member is, of course, contracted, while the spring 32 is compressed and due to the difference in the angularity of the clutch face 21 of the cup 20 and the face of the male clutch member 28, the floating clutch member 30 is, of course, independently shifted downwardly a distance greater than the independent upward movement of the clutch cup. The push rod is thus automatically contracted, but as the tappet continues in its upward movement and the inertia of the push rod element, rocker, and valve is overcome, the downward slipping of the floating clutch member 30 is arrested substantially at the instant the push rod element begins to yield to the upward movement of the tappet, when the floating clutch member wedges between the clutch face 21 of the cup and the conical face of the male clutch member to provide a rigid connection between said cup and the push rod element, so that the valve is opened.

Due to the automatic contraction of the push rod as the valve is opened, the opening travel imparted to the valve will be correspondingly shortened. Accordingly, upon the return of the tappet downwardly, the valve will seat before the tappet reaches the bottom of its throw so that the push rod element 33 will be relieved of the downward pressure otherwise exerted thereon by the valve spring 16. As a result, the spring 32 will, as the tappet completes its downward movement, expand for again shifting the floating clutch member 30 upwardly within the clutch cup 20 and thus lift the push rod element so that the members will be returned to their original positions, while all looseness between the parts will be automatically taken up. Rattling will thus be effectually prevented and, of course, as the floating clutch member is shifted upwardly said member will extend within the clutch cup to coact therewith. Should the valve fail to seat properly, the push rod will, as will be understood in view of the foregoing description, be permitted to automatically expand to compensate for the shortened closing travel of the valve while, when the valve is subsequently permitted to move into engagement with its seat, the repeated jarring communicated from the tappet to the floating clutch member, will cause said member to slip, so that the push rod will be caused to automatically contract to compensate for the increased closing travel of the valve.

Attention is now directed to the fact that by employing a frusto-conical floating clutch member, said member is shaped to provide a large bearing area to coact not only with the clutch cup 20 but also with the male clutch member 28. Premature wear of all of these parts will thus be obviated. Furthermore, since the floating clutch member will be contracted when shifted downwardly within the clutch cup 20 and will expand when shifted upwardly within said cup, said member will always maintain flat contact throughout the area of its outer face with the clutch face 21 of the cup 20 and will likewise maintain flat contact throughout the area of its inner face with the conical face of the male clutch member 28. Thus, the full frictional effect of the floating clutch member on the male and female clutch members will at all times be had.

In Figure 3 of the drawings, I have illustrated a slightly different embodiment of the invention, this embodiment being shown in connection with a conventional tappet guide 35 and tappet 36 having the customary axial socket 37. As illustrated, the slip joint of the push rod includes a female clutch member in the form of a clutch cup 38 having a conical inner face 39 and provided with a flat bottom wall 40, which rests flat against the upper end of the tappet 36. Surrounding the upper end of the cup is an overhanging flange 41, and surrounding said flange is an upstanding frusto-conical cap or housing 42 provided at its lower end with a channel member 43 tightly embracing the flange 41 for rigidly connecting the cap to the cup. Extending into the clutch cup axially thereof is a frusto-conical male clutch member 44 having a conical recess 45 and surrounding said recess is an upstanding flange 46. At its lower end said member is provided with a beveled face 47 to seat flat against the conical inner face of the clutch cup for limiting the male clutch member in its downward movement within said cup. Interposed between the male and female clutch members to coact therewith is an inverted floating clutch member 48, and resting against the edge of said floating clutch member at its larger end is a follower 49 centered by the flange 46 of the male clutch member, which flange the follower freely surrounds. Acting on the follower is a spring 50 enclosed within the housing 42.

The floating clutch member 48 is in the form of a split frustro-conical ring, the wall of which is gradually thickened from the smaller end of said member towards the larger end thereof, or the reverse of the floating clutch member 30. The member 48 is, of course, formed of resilient material so that said member may be flexed and thus expand and contract in diameter and, as will be observed, the inner and outer faces of said member are inclined to seat flat against the male and female clutch members respectively.

Extending freely through the bottom wall 40 of the female clutch cup 38 is a socket 51 which is removably received more or less freely within the recess 37 of the tappet for centering the slip joint with respect to the tappet and formed on said socket at its upper end is a flange 52 which seats flat against the inner face of the bottom wall 40 of the clutch cup for limiting the socket against downward displacement. Freely fitting within the socket to act against the male clutch member 44 is a spring 53 and in this connection it should be observed that the spring 53 is of less strength than the spring 50, while the spring 50 is of far less strength than the usual valve spring.

Extending loosely through the top wall of the housing 42 is a push rod element 54 which freely fits at its lower end in the recess 45 of the male clutch member 44, the push rod element 54 corresponding, of course, to the push rod element 33. Freely surrounding the element 54 is a cap 55 frictionally fitting tightly over the upper end of the housing 42, and enclosed by the cap 55 is a felt or equivalent element 56 slidably receiving the push rod element therethrough. This felt is preferably saturated with oil which, during the operation of the mechanism, will find its way into the slip joint for maintaining the parts lubricated. It is believed, in view of the description previously given in regard to the operation of the prior embodiment of the invention, that the operation of this latter embodiment will be understood. However, it may be observed that when the tappet starts to rise, that the floating clutch member 48 will be shifted upwardly within the cup 38 and will coincidently expand while the spring 50 will be compressed. Accordingly, upon the return of the tappet downwardly the spring 50 will, after the valve seats, expand for returning the floating clutch member downwardly within the clutch cup so that the male clutch member will be lifted and all looseness between the parts taken up, the floating clutch member being caused to contract as it is shifted downwardly. The spring 53 is provided to accelerate the upward movement of the male clutch member 44 incident to each cycle of the valve so that the parts will properly recover their normal positions at high engine speeds.

Having thus described the invention, I claim:

1. An automatic take-up device including nested conical clutch members comprising rigid inner and outer members and a coacting split annular intermediate member shiftable axially between said inner and outer members for spacing said inner and outer members and having flat contact with the inclined faces thereof.

2. An automatic take-up device including nested conical clutch members comprising rigid inner and outer members and a coacting split annular intermediate member shiftable axially between said inner and outer members for spacing said inner and outer members and having flat contact with the inclined faces thereof, the wall of said intermediate member being thickened toward one end of such member.

3. An automatic take-up device including nested conical clutch members comprising rigid inner and outer members and a coacting split annular intermediate member shiftable axially between said inner and outer members for spacing said inner and outer members and having flat contact with the inclined faces thereof, and yieldable means tending to shift said intermediate member.

4. An automatic take-up device including nested conical clutch members comprising rigid inner and outer members and a coacting split annular intermediate member shiftable axially between said inner and outer members for spacing said inner and outer members and having flat contact with the inclined faces thereof, and a spring tending to shift said intermediate member.

5. An automatic take-up device including nested conical clutch members comprising rigid inner and outer members and a coacting split annular intermediate member movable axially between said inner and outer members for spacing said inner and outer members and having flat contact with the inclined faces thereof, a socket fixed to one end of the outer member, a spring in said socket and tending to shift said intermediate member, and a cap fixed to the opposite end of said outer member and enclosing the parts.

In testimony whereof I affix my signature.

CALVIN C. WILLIAMS. [L. S.]